US007927643B2

(12) United States Patent
Dewis et al.

(10) Patent No.: US 7,927,643 B2
(45) Date of Patent: *Apr. 19, 2011

(54) COMPOSITIONS OF OXO-TERPENE DERIVATIVES AND PROCESS FOR PREPARING THE SAME

(75) Inventors: Mark Lawrence Dewis, Matawan, NJ (US); Michelle E. Huber, River Vale, NJ (US); David O. Agyemang, Sayreville, NJ (US); Garry Conklin, Pequannock, NJ (US)

(73) Assignee: International Flavors & Fragrances Inc., New York, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/407,866

(22) Filed: Mar. 20, 2009

(65) Prior Publication Data

US 2009/0180973 A1    Jul. 16, 2009

Related U.S. Application Data

(62) Division of application No. 11/419,311, filed on Jun. 16, 2006, now Pat. No. 7,534,460, which is a division of application No. 10/290,813, filed on Nov. 8, 2002, now Pat. No. 7,097,872.

(51) Int. Cl.
   *A23L 1/22* (2006.01)
(52) U.S. Cl. .......... 426/534; 426/536; 426/650
(58) Field of Classification Search .......... 426/534, 426/536, 590, 591, 592, 599, 650
   See application file for complete search history.

(56) References Cited

U.S. PATENT DOCUMENTS

| 7,097,872 B2 * | 8/2006 | Dewis et al. | 426/534 |
| 7,534,460 B2 * | 5/2009 | Dewis et al. | 426/534 |

* cited by examiner

*Primary Examiner* — Leslie Wong
(74) *Attorney, Agent, or Firm* — Elizabeth M. Quirk; XuFan Tseng; Joseph F. Leightner

(57) ABSTRACT

Described is to a process for augmenting, enhancing, modifying, or imparting a berry or citrus aroma or taste to a foodstuff or a beverage comprising the step of adding to a foodstuff or a beverage an aroma or taste augmenting, enhancing, modifying, or imparting quantity of at least an oxo-terpene carbinol, a carbinyl $C_1$-$C_6$ alkanoate, or a $C_4$-$C_6$ alkenoate.

1 Claim, 1 Drawing Sheet

COMPOSITIONS OF OXO-TERPENE DERIVATIVES AND PROCESS FOR PREPARING THE SAME

STATUS OF RELATED APPLICATIONS

This application is a divisional of U.S. Ser. No. 11/419,311, filed Jun. 16, 2006, now U.S. Pat. No. 7,534,460 which is a divisional of U.S. Ser. No. 10/290,813, filed Nov. 8, 2002, now U.S. Pat. No. 7,097,872, the contents hereby incorporated by reference as if set forth in its entirety.

FIELD OF THE INVENTION

Our invention relates to a process for augmenting, enhancing, modifying, or imparting an aroma or taste of fruity, berry, cranberry and/or hedonically-stable citrus to a foodstuff, a chewing gum, a medicinal product, a toothpaste, or a beverage including an alcoholic beverage, e.g., a carbonated citrus, "punch", cranberry or berry-flavored beverage, comprising the step of adding an aroma or taste augmenting, enhancing, modifying, or imparting quantity of at least a terpene carbinol, a carbinyl $C_1$-$C_6$ alkanoate or a carbinyl $C_4$-$C_6$ alkenoate defined according to the following structures, with the proviso that if the aroma or taste is hedonically-stable citrus, 3,7-dimethyl-2,6-octadienal ('citral') and 4,8-dimethyl-3,7-nonadien-2-one (CITRONONE, trademark of Bayer Corp., Pittsburgh, Pa.) are substantially absent:

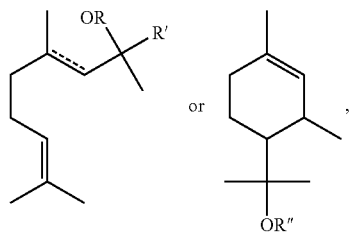

wherein the covalent bond containing the dashed line represents a carbon-carbon single bond or a carbon-carbon double bond; wherein R is hydrogen, $C_1$-$C_6$ alkanoyl or $C_4$-$C_6$ alkenoyl; wherein R' is hydrogen or methyl; and wherein R" is hydrogen or acetyl, hereinafter referred to as "terpene carbinols and terpenyl carbinyl esters" or "oxo-terpene derivatives", for example, in the alternative or taken together:

4,8-dimethyl-3,7-nonadien-2-ol;
4,8-dimethyl-3,7-nonadien-2-yl acetate;
4,8-dimethyl-3,7-nonadien-2-yl butyrate;
4,8-dimethyl-3,7-nonadien-2-yl (2'-methyl-2'-pentenoate);
4,8-dimethyl-7-nonen-2-ol;
4,8-dimethyl-7-nonen-2-yl acetate;
2,4,8-trimethyl-7-nonen-2-ol;
2,4,8-trimethyl-3,7-nonadien-2-ol;
α,α,2,4-tetramethyl-3-cyclohexene-1-methanol; and/or α,α,2,4-tetramethyl-3-cyclohexene-1-methyl acetate as such, or in further combination with a cis-isomer or a trans-isomer or a mixture of cis- and trans-isomers of one or more acyclic enol ethers defined according to the structure: $CH_3(CH_2)_7$—CH=CH—$OR_1$, wherein $R_1$ represents methyl or ethyl.

Our invention also relates to the novel compositions of matter, to wit:
(a) The compound, α,α,2,4-tetramethyl-3-cyclohexene-1-methyl acetate;
(b) The compound, 4,8-dimethyl-3,7-nonadien-2-yl (2'-methyl-2'-pentenoate);
(c) The compound, 2,4,8-trimethyl-3,7-nonadien-2-ol;
(d) The mixture of compounds:
  from about 5 up to about 95 weight % of 4,8-dimethyl-3,7-nonadien-2-ol and α,α,2,4-tetramethyl-3-cyclohexene-1-methanol;
  from about 0.1 up to about 95 weight % of 2,4,8-trimethyl-7-nonen-2-ol; and
  from about 5 up to about 95 weight % of 4,8-dimethyl-3,7-nonadien-2-yl acetate;
(e) The mixture of compounds:
  from about 5 up to about 95 weight % of 4,8-dimethyl-3,7-nonadien-2-ol;
  from about 0.1 up to about 95 weight % of 2,4,8-trimethyl-7-nonen-2-ol; and
  from about 5 up to about 95 weight % of 4,8-dimethyl-3,7-nonadien-2-yl acetate;
(f) The mixture of compounds:
  from about 20 up to about 80 weight % of 4,8-dimethyl-3,7-nonadien-2-ol and α,α,2,4-tetramethyl-3-cyclohexene-1-methanol; and
  from about 20 up to about 80 weight % of 4,8-dimethyl-3,7-nonadien-2-yl acetate;
(g) The mixture of compounds:
  from about 20 up to about 80 weight % of 4,8-dimethyl-3,7-nonadien-2-ol; and
  from about 20 up to about 80 weight % of 4,8-dimethyl-3,7-nonadien-2-yl acetate;
(h) The mixture of compounds:
  from about 5 up to about 95 weight % of 2,4,8-trimethyl-3,7-nonadien-2-ol; and
  from about 5 up to about 95 weight % of α,α,2,4-tetramethylcyclohexene-1-methanol;
(i) The mixture of compounds:
  from about 10 up to about 90 weight % of 4,8-dimethyl-3,7-nonadien-2-ol;
  from about 10 up to about 90 weight % of 4,8-dimethyl-3,7-nonadien-2-yl acetate; and
  from about 10 up to about 90 weight % of a cis-isomer or a trans-isomer or a mixture of cis- and trans-isomers of one or more acyclic enol ethers defined according to the structure: $CH_3(CH_2)_7$—CH=CH—$OR_1$, wherein $R_1$ represents methyl or ethyl; and
(j) The mixture of compounds:
  from about 10 up to about 90 weight % of 4,8-dimethyl-3,7-nonadien-2-ol and α,α,2,4-tetramethylcyclohexene-1-methanol;
  from about 10 up to about 90 weight % of 4,8-dimethyl-3,7-nonadien-2-yl acetate; and
  from about 10 up to about 90 weight % of a cis-isomer or a trans-isomer or a mixture of cis- and trans-isomers of one or more acyclic enol ethers defined according to the structure: $CH_3(CH_2)_7$—CH=CH—$OR_1$, wherein $R_1$ represents methyl or ethyl;

and uses thereof in augmenting, enhancing, modifying, or imparting an aroma or taste to a foodstuff, a chewing gum, a medicinal product, a toothpaste, or a beverage including an alcoholic beverage, particularly providing a) an acceptable citrus flavor profile, hedonically stable to storage at an acidic pH in the range of from about 2 up to about 4, eliminating the need for the use of citral in citrus flavor formulations; b) an acceptable fruit flavor profile, specifically for flavored beverages such as 'punch' flavored beverages; c) an acceptable berry flavor profile specifically for 'mixed berry'-flavored beverages; and d) an acceptable cranberry flavor profile specifically for cranberry-flavored beverages.

BACKGROUND OF THE INVENTION

There has been considerable work performed relating to substances which can be used to impart or alter, augment, modify or enhance flavors to, or in various consumable materials. These substances are used to diminish the use of natural materials, some of which may be in short supply and to provide more uniform properties in the finished product. Citrus, citrus peel, lemon, lemon rind, lime, grapefruit, grapefruit peel, fruity, melon, berry, seedy, strawberry, cranberry, pineapple, floral, earthy, wood, pine, woody/pine, herbal, tea-like, musty and cheesy aromas and tastes with raspberry undertones are particularly desirable for many uses in foodstuff, beverage including alcoholic beverage, toothpaste, medicinal product and chewing gum flavors, particularly citrus, lemon, grapefruit, orange, berry, cranberry and "red fruit" flavors.

Furthermore, despite the large number of existing flavors each of which has a citrus profile, there continues to be a need in the field of imparting, augmenting, modifying and enhancing flavors to or in consumable articles having a pH less than about or about equal to 4, an 'acidic' pH, such as carbonated beverages, for novel flavors which, in addition to having a desirable flavor profile, have other desirable functional properties. One such desirable functional property is the stability and shelf life of the flavor as subsequently admixed with the consumable article base. The need for long-lasting stability and lasting shelf-life is a particular outstanding need in the citrus flavor area, especially where there has been a desire to replace some of the character offered by citral while at the same time eliminating the 'off-notes' generated by storage. This is of particular consequence when used in applications employing an acidic media, at a pH less than about or about equal to 4, for example a carbonated beverage, or a low-proof alcoholic beverage.

Publications setting forth relevant attempts to solve the aforementioned problem exist in the prior art. Thus, 4,8-dimethyl-3,7-nonadien-2-one is indicated to have a modicum of stability in floral fragrances and various cosmetic compositions in Lambrecht et al. (U.S.20010005711A1 published on Jun. 28, 2001). Among the many adjuvants indicated by Lambrecht et al. to be useful in combination with the 4,8-dimethyl-3,7-nonadien-2-one is Z-4,8-dimethyl-3,7-nonadien-2-ol. Similarly, Haarman & Reimer GmbH. (DE19961030 published on Jun. 21, 2001) discloses the use of 4,8-dimethyl-3,7-nonadien-2-one in conjunction with a large number of possible adjuvants including E- and Z-4,8-dimethyl-3,7-nonadien-2-ol, alleged therein to be useful in foodstuffs and luxury foods or in preparations used for oral hygiene. No other prior art implies or specifically discloses the utility of any of the terpene carbinols or carbinyl esters of our invention in flavors. However, the synthesis and odor character of 4,8-dimethyl-3,7-nonadien-2-yl acetate CAS 91418-25-6; 2,4,8-trimethyl-7-nonen-2-ol CAS 437770-28-0; and (4R)-2,4,8-trimethyl-7-nonen-2-ol CAS 89272-60-6 are described in Agarwal et al., *Indian Perfum.*, 1983, 27, 112-118 and the synthesis and odor character of 4,8-dimethyl-7-nonen-2-ol CAS 40596-76-7 and 4,8-dimethyl-7-nonen-2-yl acetate CAS 73013-96-4 are described in Sethi et al., *Indian Perfum.*, 1978, 22, 225-228. In addition, the synthesis of α,α,2,4-tetramethyl-3-cyclohexene-1-methanol CAS 27455-92-1, has been described in the abstract of Bol. Inst. Quim. Univ. Nac. Auton. Mex., 1969, 21, 226-240.

Nevertheless, the prior art does not contain any disclosures and does not imply the novel compositions of matter of our invention and the novel utilities of the terpene carbinols and terpene carbinyl esters, the "oxo-terpenes", of our invention which have unexpected, unobvious and advantageous organoleptic utilities.

DETAILED DESCRIPTION OF THE INVENTION

The present invention relates to a process for augmenting, enhancing, modifying, or imparting an aroma or taste of fruity, berry, cranberry and/or hedonically-stable citrus to a foodstuff, a chewing gum, a medicinal product, a toothpaste, or a beverage including an alcoholic beverage, e.g. a carbonated citrus, "punch", cranberry or berry-flavored beverage, comprising the step of adding an aroma or taste augmenting, enhancing, modifying, or imparting quantity of at least a terpene carbinol, a carbinyl $C_1$-$C_6$ alkanoate or a carbinyl $C_4$-$C_6$ alkenoate defined according to the following structures, with the proviso that if the aroma or taste is hedonically-stable citrus, 3,7-dimethyl-2,6-octadienal ('citral') and 4,8-dimethyl-3,7-nonadien-2-one (commercially available as CITRONONE) are substantially absent:

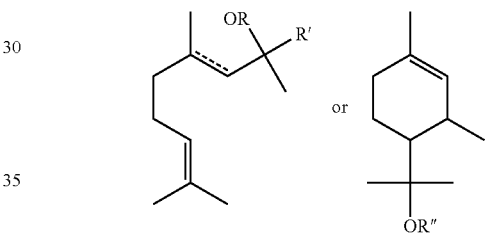

wherein the covalent bond containing the dashed line represents a carbon-carbon single bond or a carbon-carbon double bond; wherein R is hydrogen, $C_1$-$C_6$ alkanoyl or $C_4$-$C_6$ alkenoyl; wherein R' is hydrogen or methyl and wherein R" is hydrogen or acetyl as such, or further in combination with a cis-isomer or a trans-isomer or a mixture of cis- and trans-isomers of one or more acyclic enol ethers defined according to the structure: $CH_3(CH_2)_7$—CH=CH—$OR_1$, wherein $R_1$ represents methyl or ethyl as disclosed in U.S. Ser. No. 10/195,663, filed Jul. 15, 2002, the disclosure of which is incorporated herein by reference.

Preferred terpene carbinols and esters thereof or 'oxo-terpene derivatives' useful in the practice of our invention are, in the alternative or taken together:
4,8-dimethyl-3,7-nonadien-2-ol;
4,8-dimethyl-3,7-nonadien-2-yl acetate;
4,8-dimethyl-3,7-nonadien-2-yl butyrate;
4,8-dimethyl-3,7-nonadien-2-yl (2'-methyl-2'-pentenoate);
4,8-dimethyl-7-nonen-2-ol;
4,8-dimethyl-7-nonen-2-yl acetate;
2,4,8-trimethyl-7-nonen-2-ol;
2,4,8-trimethyl-3,7-nonadien-2-ol;
α,α,2,4-tetramethyl-3-cyclohexene-1-methanol; and/or
α,α,2,4-tetramethyl-3-cyclohexene-1-methyl acetate.

Preferred acyclic enol ethers useful in the practice of our invention are (a) the 55:45 cis:trans isomer mixture of 1-ethoxydec-1-ene; and (b) the 51:49 cis:trans isomer mixture of 1-methoxydec-1-ene.

Our invention also relates to the novel compositions of matter, to with:
- (a) The compound, α,α,2,4-tetramethyl-3-cyclohexene-1-methyl acetate;
- (b) The compound, 4,8-dimethyl-3,7-nonadien-2-yl (2'-methyl-2'-pentenoate);
- (c) The compound, 2,4,8-trimethyl-3,7-nonadien-2-ol;
- (d) The mixture of compounds:
    from about 5 up to about 95 weight % of 4,8-dimethyl-3,7-nonadien-2-ol and α,α,2,4-tetramethyl-3-cyclohexene-1-methanol;
    from about 0.1 up to about 95 weight % of 2,4,8-trimethyl-7-nonen-2-ol; and
    from about 5 up to about 95 weight % of 4,8-dimethyl-3,7-nonadien-2-yl acetate;
- (e) The mixture of compounds:
    from about 5 up to about 95 weight % of 4,8-dimethyl-3,7-nonadien-2-ol;
    from about 0.1 up to about 95 weight % of 2,4,8-trimethyl-7-nonen-2-ol; and
    from about 5 up to about 95 weight % of 4,8-dimethyl-3,7-nonadien-2-yl acetate;
- (f) The mixture of compounds:
    from about 20 up to about 80 weight % of 4,8-dimethyl-3,7-nonadien-2-ol and α,α,2,4-tetramethyl-3-cyclohexene-1-methanol; and
    from about 20 up to about 80 weight % of 4,8-dimethyl-3,7-nonadien-2-yl acetate;
- (g) The mixture of compounds:
    from about 20 up to about 80 weight % of 4,8-dimethyl-3,7-nonadien-2-ol; and
    from about 20 up to about 80 weight % of 4,8-dimethyl-3,7-nonadien-2-yl acetate;
- (h) The mixture of compounds:
    from about 5 up to about 95 weight % of 2,4,8-trimethyl-3,7-nonadien-2-ol; and
    from about 5 up to about 95 weight % of α,α,2,4-tetramethylcyclohexene-1-methanol;
- (i) The mixture of compounds:
    from about 10 up to about 90 weight % of 4,8-dimethyl-3,7-nonadien-2-ol;
    from about 10 up to about 90 weight % of 4,8-dimethyl-3,7-nonadien-2-yl acetate; and
    from about 10 up to about 90 weight % of a cis-isomer or a trans-isomer or a mixture of cis- and trans-isomers of one or more acyclic enol ethers defined according to the structure: $CH_3(CH_2)_7—CH=CH—OR_1$, wherein $R_1$ represents methyl or ethyl; and
- (j) The mixture of compounds:
    from about 10 up to about 90 weight % of 4,8-dimethyl-3,7-nonadien-2-ol and α,α,2,4-tetramethylcyclohexene-1-methanol;
    from about 10 up to about 90 weight % of 4,8-dimethyl-3,7-nonadien-2-yl acetate; and
    from about 10 up to about 90 weight % of a cis-isomer or a trans-isomer or a mixture of cis- and trans-isomers of one or more acyclic enol ethers defined according to the structure: $CH_3(CH_2)_7—CH=CH—OR_1$, wherein $R_1$ represents methyl or ethyl;

and uses thereof in augmenting, enhancing, modifying, or imparting an aroma or taste to a foodstuff, a chewing gum, a medicinal product, a toothpaste, or a beverage including an alcoholic beverage, particularly providing an acceptable citrus flavor profile, hedonically stable to storage at an acidic pH in the range of from about 2 up to about 4, eliminating the need for the use of citral in citrus flavor formulations; an acceptable fruit flavor profile, specifically for red fruit flavored beverages such as 'punch' flavored beverages; an acceptable berry flavor profile specifically for 'mixed berry'-flavored beverages and an acceptable cranberry flavor profile specifically for cranberry-flavored beverages.

The terpene carbinols and terpene carbinyl esters useful in the practice of our invention, taken alone, in combination with one-another, or in combination with other flavor adjuvants in the construction of flavor compositions, impart, enhance, modify or augment citrus, citrus peel, lemon, lemon rind, lime, grapefruit, grapefruit peel, fruity, melon, berry, seedy, strawberry, cranberry, pineapple, floral, earthy, woody, pine, woody/pine, herbal, tea-like, musty and cheesy aroma and taste nuances with raspberry undertones to foodstuffs, chewing gums, medicinal products, toothpastes, or beverages including alcoholic beverages. The terpene carbinols and esters thereof useful in the practice of our invention may be in the form of achiral materials or as optically active R and/or S isomers, and in appropriate cases as individual E- or Z-isomers or mixtures thereof.

More particularly, the terpene carbinols and the terpene carbinyl esters of our invention taken in combination with at least one cis-isomer or a trans-isomer or a mixture of cis- and trans-isomers of one or more acyclic enol ethers defined according to the structure: $CH_3(CH_2)_7—CH=CH—OR_1$, wherein $R_1$ represents methyl or ethyl when used in citrus flavor formulations rounds out the flavor profile in a synergistic manner with the terpene carbinol and/or the terpene carbinyl acetate in combination with one or more of the aforementioned acyclic enol ethers being a synergistic combination of flavoring substances, particularly in the field of citrus flavors, and preferably in the field of lemon, lime and orange flavors.

It is surprising that the terpene carbinols and terpene carbinyl esters, the 'oxo-terpene derivatives' of our invention when used in flavor compositions not only effect in said flavor compositions the specific aroma and taste profiles as more particularly described herein but also effect intensification of the aroma and taste nuances such that one can perceive extremely low levels of said flavor compositions, specifically from about 0.05 weight percent up to about 25 weight % of the flavor composition and preferably from about 0.1 weight percent up to about 5 weight % of the flavor composition. Furthermore, the olfactory perception of the individual components is enhanced as a result of the unexpected organoleptic synergism of the individual components of the mixtures with the terpene carbinols and terpene carbinyl esters of our invention.

The level of use of the flavor compositions containing the terpene carbinols and terpene carbinyl esters of our invention in the consumable material, e.g., the foodstuff, chewing gum, toothpaste, medicinal product, or beverage including alcoholic beverage may vary from about 10 ppm, in the case of alcoholic beverages, up to about 5 weight %, preferably from about 20 ppm in the case of alcoholic beverages up to about 1 weight %.

It is further surprising that a number of the terpene carbinols and terpene carbinyl esters of our invention, to with:
4,8-dimethyl-3,7-nonadien-2-ol;
4,8-dimethyl-3,7-nonadien-2-yl acetate;
4,8-dimethyl-7-nonen-2-ol;
4,8-dimethyl-7-nonen-2-yl acetate;
2,4,8-trimethyl-7-nonen-2-ol; and
α,α,2,4-tetramethyl-3-cyclohexene-1-methanol
hereinafter termed: "citrusy terpene carbinols and carbinyl esters" either individually or as mixtures have greater flavor "hedonic stability" in applications such as carbonated beverages than compounds traditionally used with similar odor properties. The terms "hedonic stability", "hedonic flavor stability" and "hedonically stable" are herein intended to mean "substantial consistency in the degree of mammalian taste preference"; and the illustration of such hedonic stability and hedonic flavor stability is set forth in FIG. 1 attached hereto and described infra. If the "citrusy terpene carbinols and/or terpene carbinyl esters" of our invention as set forth herein are used instead of other similar flavor materials such as citral, citronellal, geranial or neral, no 'off notes' of any kind are perceived in the flavor profile on extended storage. The hedonic instability of the aforementioned compounds: citral, citronellal, geranial and neral generate off notes that cause the flavor of the final application unacceptable. It is therefore an aim in the flavor industry to preserve the freshness or maintain the hedonic flavor stability of flavor compositions containing these traditionally unstable components. The use of the above mentioned "citrusy terpene carbinols and terpene carbinyl esters" of our invention allows for the creation of new and novel flavors that maintain the fresh citrus character throughout the shelf life of the final application. In summary, the "citrusy terpene carbinols and terpene carbinyl esters" of our invention surprisingly show a great stability to storage, both in respect to acidic pH stability and to thermal stability particularly at a pH less than about or about equal to 4.

In addition, each of the "citrusy terpene carbinols and carbinyl esters" of our invention has the property, individually or in combination, even in very low concentrations, of aiding the creation of a natural citrus flavor profile when added in combination with other components to the corresponding essential oil from which citral has been removed. We have also determined that it is advantageous in the practice of our invention to ensure that the application of the "citrusy terpene carbinols and carbinyl esters" of our invention is in the substantial absence of the ketone, 4,8-dimethyl-3,7-nonadien-2-one. Accordingly, the application of the "citrusy terpene carbinols and carbinyl esters" of our invention is intended herein to be in the substantial absence of citral and, in addition, 4,8-dimethyl-3,7-nonadien-2-one. The term substantial absence is intended herein to mean less than about or about equal to 0.25% by weight of the flavor ingredient being added to a flavor composition or to a consumable material. Thus for example, in the event that 20 ppm of 4,8-dimethyl-3,7-nonadien-2-yl acetate is added to high proof vodka in order to impart a flavor aroma and taste nuance thereto, the 4,8-dimethyl-3,7-nonadien-2-yl acetate contains less than about or about equal to 0.25 weight % citral, and less about or about equal to 0.25 weight % 4,8-dimethyl-3,7-nonadien-2-one.

In specific compositions of our invention, when in aqueous media at a pH less than about or about equal to 4, a substantial amount of the compound, α,α,2,4-tetramethyl-3-cyclohexene-1-methanol is formed in situ from the compound, 4,8-dimethyl-3,7-nonadien-2-ol. Thus, whenever the compound, 4,8-dimethyl-3,7-nonadien-2-ol is introduced into a consumable material having a pH less than about or about equal to 4 for the purpose of employing its organoleptic properties, the compound, α,α,2,4-tetramethyl-3-cyclohexene-1-methanol is formed in situ in aqueous acidic media.

Thus, with reference to the novel mixtures of our invention which when the pH less than about or about or about equal to 4 contain:
from about 5 up to about 95 weight % of 4,8-dimethyl-3,7-nonadien-2-ol and α,α,2,4-tetramethyl-3-cyclohexene-1-methanol;
from about 0.1 up to about 95 weight % of 2,4,8-trimethyl-7-nonen-2-ol; and
from about 5 up to about 95 weight % of 4,8-dimethyl-3,7-nonadien-2-yl acetate,
or which when the pH less than about or about equal to 4 contain:
from about 20 up to about 80 weight % of 4,8-dimethyl-3,7-nonadien-2-ol and α,α,2,4-tetramethyl-3-cyclohexene-1-methanol; and
from about 20 up to about 80 weight % of 4,8-dimethyl-3,7-nonadien-2-yl acetate,
or which when the pH less than about or about equal to 4 contain:
from about 10 up to about 90 weight % of 4,8-dimethyl-3,7-nonadien-2-ol and α,α,2,4-tetramethylcyclohexene-1-methanol;
from about 10 up to about 90 weight % of 4,8-dimethyl-3,7-nonadien-2-yl acetate; and
from about 10 up to about 90 weight % of a cis-isomer or a trans-isomer or a mixture of cis- and trans-isomers of one or more acyclic enol ethers defined according to the structure: $CH_3(CH_2)_7$—CH═CH—$OR_1$, wherein $R_1$ represents methyl or ethyl,
preferred embodiments of such mixtures are useful in augmenting, enhancing, modifying, and/or imparting an aroma or taste of hedonically-stable citrus to a foodstuff, a chewing gum, a toothpaste, a medicinal product, and a beverage including an alcoholic beverage. The term "citrus" is herein intended to encompass orange, lime, grapefruit, yuzu, quince, lemon, mandarin, tangerine, clementine, and citrus hybrids for example *Citrus sinensis* L. Osbeck x *C. clementina* Hort. ex Tanaka as disclosed by Ruberto and Rapisarda, *Journal of Food Science*, 67, 7 2778-2780 (2002).

More specifically, compositions which contain:
from about 20 up to about 60 weight % of 4,8-dimethyl-3,7-nonadien-2-ol and α,α,2,4-tetramethyl-3-cyclohexene-1-methanol;
from about 0.1 up to about 5 weight % of 2,4,8-trimethyl-7-nonen-2-ol; and
from about 20 up to about 60 weight % of 4,8-dimethyl-3,7-nonadien-2-yl acetate are preferably useful in augmenting, enhancing, modifying, and/or imparting hedonically stable lemon aromas and/or tastes to foodstuffs, chewing gums, medicinal products, toothpastes, and beverages including alcoholic beverages having a pH less than about or equal about to 4.

Compositions which contain:
from about 5 up to about 15 weight % of 4,8-dimethyl-3,7-nonadien-2-ol and α,α,2,4-tetramethyl-3-cyclohexene-1-methanol;
from about 80 up to about 95 weight % of 2,4,8-trimethyl-7-nonen-2-ol; and
from about 5 up to about 15 weight % of 4,8-dimethyl-3,7-nonadien-2-yl acetate
are preferably useful in augmenting, enhancing, modifying, and/or imparting hedonically stable grapefruit aromas and/or tastes to foodstuffs, chewing gums, medicinal products, toothpastes, and beverages including alcoholic beverages having a pH less than about or equal about to 4.

Compositions which contain:
from about 20 up to about 80 weight % of 4,8-dimethyl-3,7-nonadien-2-ol and α,α,2,4-tetramethyl-3-cyclohexene-1-methanol; and
from about 20 up to about 80 weight % of 4,8-dimethyl-3,7-nonadien-2-yl acetate
are preferably useful in augmenting, enhancing, modifying, and/or imparting hedonically stable orange aromas and/or tastes to foodstuffs, chewing gums, medicinal products, toothpastes, or beverages including alcoholic beverages having a pH less than about or equal about to 4.

Compositions which contain:
from about 10 up to about 90 weight % of 4,8-dimethyl-3,7-nonadien-2-ol and α,α,2,4-tetramethylcyclohexene-1-methanol;
from about 10 up to about 90 weight % of 4,8-dimethyl-3,7-nonadien-2-yl acetate; and
from about 10 up to about 90 weight % of a cis-isomer or a trans-isomer or a mixture of cis- and trans-isomers of one or more acyclic enol ethers defined according to the structure: $CH_3(CH_2)_7$—CH═CH—$OR_1$, wherein $R_1$ represents methyl or ethyl are preferably useful in augmenting, enhancing, modifying, and/or imparting hedonically stable orange or lemon-lime aromas and/or tastes to foodstuffs, chewing gums, medicinal products, toothpastes, or beverages including alcoholic beverages having a pH less than about or equal about to 4.

With respect to the aforementioned beverages, our invention is also specifically directed to:

a) A carbonated beverage having a pH of from about 2 up to about 4, comprising water having dissolved therein carbon dioxide at substantially a saturation level at a temperature of from about 5 up to about 40° C. and a pressure of from about 1 up to about 4 atmospheres absolute, and having intimately admixed therewith a hedonically stable taste imparting quantity of at least one of the following terpene carbinols and/or carbinyl acetates:
4,8-dimethyl-3,7-nonadien-2-ol;
4,8-dimethyl-3,7-nonadien-2-yl acetate;
4,8-dimethyl-7-nonen-2-ol;
4,8-dimethyl-7-nonen-2-yl acetate;
2,4,8-trimethyl-7-nonen-2-ol; and
α,α,2,4-tetramethyl-3-cyclohexene-1-methanol
in the substantial absence of citral and 4,8-dimethyl-3,7-nonadien-2-one;

b) A fruit beverage comprising water having dissolved therein at least one of the following compounds:
α,α,2,4-tetramethyl-3-cyclohexene-1-methyl acetate;
4,8-dimethyl-3,7-nonadien-2-yl (2'-methyl-2'-pentenoate); and/or
2,4,8-trimethyl-3,7-nonadien-2-ol;

c) A carbonated citrus beverage having a pH of from about 2 up to about 4, comprising water having dissolved therein carbon dioxide at substantially a saturation level at a temperature of from about 5 up to about 40° C., and a pressure of from about 1 up to about 4 atmospheres absolute, and having intimately admixed therewith a hedonically stable taste imparting quantity of at least one of the following terpene carbinol and/or carbinyl acetate-containing compositions:

i) for carbonated lemon beverages—
from about 20 up to about 60 weight % of 4,8-dimethyl-3,7-nonadien-2-ol and α,α,2,4-tetramethyl-3-cyclohexene-1-methanol;
from about 0.1 up to about 5 weight % of 2,4,8-trimethyl-7-nonen-2-ol; and
from about 20 up to about 60 weight % of 4,8-dimethyl-3,7-nonadien-2-yl acetate
in the substantial absence of citral and 4,8-dimethyl-3,7-nonadien-2-one;

ii) for carbonated grapefruit beverages—
from about 5 up to about 15 weight % of 4,8-dimethyl-3,7-nonadien-2-ol and α,α,2,4-tetramethyl-3-cyclohexene-1-methanol;
from about 80 up to about 95 weight % of 2,4,8-trimethyl-7-nonen-2-ol; and
from about 5 up to about 15 weight % of 4,8-dimethyl-3,7-nonadien-2-yl acetate
in the substantial absence of citral and 4,8-dimethyl-3,7-nonadien-2-one;

iii) for carbonated orange beverages—
from about 20 up to about 80 weight % of 4,8-dimethyl-3,7-nonadien-2-ol and α,α,2,4-tetramethyl-3-cyclohexene-1-methanol; and
from about 20 up to about 80 weight % of 4,8-dimethyl-3,7-nonadien-2-yl acetate
in the substantial absence of citral and 4,8-dimethyl-3,7-nonadien-2-one;

iv) for carbonated lemon-lime and carbonated or non-carbonated orange beverages—
from about 10 up to about 90 weight % of 4,8-dimethyl-3,7-nonadien-2-ol and α,α,2,4-tetramethylcyclohexene-1-methanol;
from about 10 up to about 90 weight % of 4,8-dimethyl-3,7-nonadien-2-yl acetate; and
from about 10 up to about 90 weight % of a cis-isomer or a trans-isomer or a mixture of cis- and trans-isomers of one or more acyclic enol ethers defined according to the structure: $CH_3(CH_2)_7$—CH═CH—$OR_1$, wherein $R_1$ represents methyl or ethyl;

d) A carbonated berry-flavored beverage having a pH of from about 2 up to about 4, comprising water having dissolved therein carbon dioxide at substantially a saturation level at a temperature of from about 5 up to about 40° C. and a pressure of from about 1 up to about 4 atmospheres absolute, and having intimately admixed therewith a berry taste imparting quantity of a mixture of 4,8-dimethyl-3,7-nonadien-2-ol and α,α,2,4-tetramethyl-3-cyclohexene-1-methanol; and e) A cranberry beverage comprising apple juice and dissolved therein a cranberry aroma or taste augmenting, enhancing, modifying, or imparting quantity of the composition containing:
from about 5 up to about 95 weight % of 2,4,8-trimethyl-3,7-nonadien-2-ol; and
from about 5 up to about 95 weight % of α,α,2,4-tetramethyl-3-cyclohexene-1-methanol.

More specifically, the organoleptic properties for each of the terpene carbinols and terpene carbinyl esters of our invention are as follows:

4,8-Dimethyl-3,7-nonadien-2-yl acetate: a lemon rind, citrus, earthy, woody aroma and taste profile bearing some similarities to 4-Terpinenol. This material has the ability to be used to impart a fresh citrus note to citrus flavors.

4,8-Dimethyl-3,7-nonadien-2-ol: a woody/pine, lemon, lime, citronellol like aroma and taste profile, slightly reminiscent of neryl acetate. This material has the ability to be used in citrus and red fruit flavors. It also has the ability to be used for fresh fruit notes in citrus flavors and can be used to enhance the seediness of berry flavors. It will enhance ionones in a considerable proportion of berry flavors.

2,4,8-Trimethyl-7-nonen-2-ol: a grapefruit, citrus, floral, nootkatone, citronellal like aroma and taste profile, bearing some similarities to the aroma and taste profile of citronellyl acetate. This material has the ability to be used as a top-note in flavor components the purpose of which is to impart juiciness to the flavor of the ultimate end product, the consumable material. It has the ability to be used in grapefruit flavors as an enhancer. It imparts a typically grapefruit character when used as a top-note when it is added to either grapefruit or orange oil.

4,8-Dimethyl-7-nonen-2-ol: a citronellal like, lemon, grapefruit, floral, and citrus aroma and taste profile. This material has the ability to be used to impart a peel note to citrus flavors and can also be used in grapefruit blends as an enhancer.

α,α,2,4-Tetramethyl-3-cyclohexene-1-methanol: a woody, floral, seedy, and medicinal aroma and taste profile. This material has the ability to be used in berry flavors to increase the seed character.

2,4,8-Trimethyl-3,7-nonadien-2-ol: an earthy, herbal, pine, and melon aroma and taste profile.

4,8-Dimethyl-7-nonene-2-yl acetate: a berry, floral aroma and taste profile, reminiscent of ionone. This material has the ability to be used in berry flavors as an ionone enhancer.

4,8-Dimethyl-3,7-nonadien-2-yl (2'-methyl-2'-pentenoate): a strawberry, cranberry, and pineapple aroma and taste profile. This material has the ability to be used in berry flavors to enhance the fruitiness and increase the overall strawberry character.

α,α,2,4-Tetramethyl-3-cyclohexene-1-methyl acetate: a woody, tea like, floral, and citrus aroma and taste profile. This material has the ability to be used in berry flavors to increase the ripe and seedy characteristics.

4,8-Dimethyl-3,7-nonadien-2-yl butyrate: a musty, cheesy, and fruity aroma and taste profile.

Synthesis of the prior art terpene carbinols and terpene carbinyl esters useful in the practice of our invention are known to those having ordinary skill in the art, for example, the synthesis of 4,8-dimethyl-3,7-nonadien-2-yl acetate CAS 91418-25-6; 2,4,8-trimethyl-7-nonen-2-ol CAS 437770-28-0; and (4R)-2,4,8-trimethyl-7-nonen-2-ol CAS 89272-60-6 are described in Agarwal et al., *Indian Perfum.*, 1983, 27, 112-118 and the synthesis of 4,8-dimethyl-7-nonen-2-ol CAS 40596-76-7 and 4,8-dimethyl-7-nonen-2-yl acetate CAS 73013-96-4 are described in Sethi et al., *Indian Perfum.*, 1978, 22, 225-228. In addition, the synthesis of α,α,2,4-tetramethyl-3-cyclohexene-1-methanol CAS 27455-92-1, is described in the abstract of Bol. Inst. Quim. Univ. Nac. Auton. Mex., 1969, 21, 226-240.

With reference to the novel compounds of our invention, the synthesis of (3E)-2,4,8-trimethyl-3,7-nonadien-2-ol and (3Z)-2,4,8-trimethyl-3,7-nonadien-2-ol is effected by means of the reaction of methyl geranate with methyl magnesium chloride in tetrahydrofuran, herein also referred to as THF, according to the scheme.

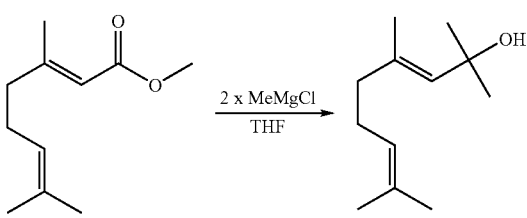

as set forth in Example I herein. The Grignard reagent can be added to the methyl geranate in 1.8 to 2.5 equivalents at temperature ranging from 0° C. to reflux temperature, most preferably from 20 to 50° C. The reaction can be quenched with aqueous sodium carbonate, sodium bicarbonate, acetic acid, sulfuric acid or hydrochloric acid, most preferably with an acid quench. The reaction occurs in 80-90% yield.

Similarly, the reaction of methyl 3,7-dimethyl-6-octenoate with methyl Grignard reagent afforded (4R/S)-2,4,8-trimethyl-7-nonen-2-ol in greater than about 80% yield.

Formation of α,α,2,4-tetramethyl-3-cyclohexene-1-methyl acetate is preferably effected by means of reaction of the corresponding alcohol (α,α,2,4-tetramethyl-3-cyclohexene-1-methanol) with acetic anhydride under pyridine catalysis according to the scheme:

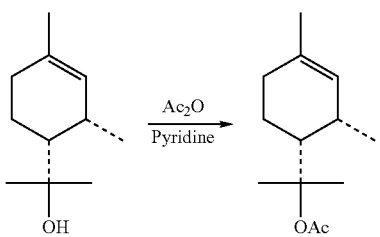

wherein the dashed lines represent covalent carbon-carbon bonding to asymmetric carbon atoms, signifying mixtures of diastereoisomers as set forth in Example II herein. The reaction occurs at 20° C. to reflux and results in a yield greater than about 80%.

Formation of the ester, 4,8-dimethyl-3,7-nonadien-2-yl (2'-methyl-2'-pentenoate) is effected according to the transesterification reaction:

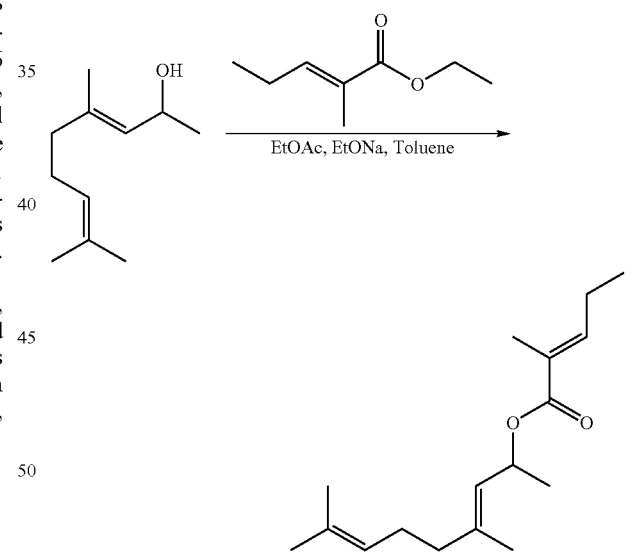

wherein 4,8-dimethyl-3,7-nonadien-2-ol (CAS 67845-50-5) is reacted with ethyl 2-methyl-2-pentenoate in the presence of an alkali metal alkoxide catalyst, for example, sodium ethoxide in the presence of an inert solvent such as toluene. The mixture is stirred and heated to reflux and then maintained at reflux for a period of time of from about 3 hours up to about 10 hours.

The flavoring compositions of our invention can be prepared by techniques well known to those having ordinary skill in the art, as by mixing the involved ingredients within the proportions stated. Furthermore, flavoring compositions in the form of particulate solids can be conventionally prepared by admixing the oxo-terpene derivatives of our invention with, for example, gum arabic, gum tragacanth, carrageenan and the like, and thereafter spray-drying or freeze-drying the resultant mixture in order to obtain the particulate solid product. Pre-prepared flavor mixes in powder form, e.g., fruit-flavored powder mix are obtained by mixing the dried solid components, e.g., starch, modified starches, sugar and the like and the oxo-terpene derivatives of our invention in a dry blender until the requisite degree of uniformity is achieved.

It is presently preferred to combine with the oxo-terpene derivatives of our invention the following adjuvants, as shown in the examples herein: n-octanal, n-nonanal, n-decanal, n-undecanal, valencene, geranyl acetate, neryl acetate, alpha-terpineol, 4-terpinenol, linalool, nerol, geraniol, ocimene, myrcene, beta-pinene, alpha-pinene, mandarin oil, tangerine oil, lemon oil, citral-free, orange oil, grapefruit oil, ethyl butyrate, ethyl acetate, nootkatone, bergamot oil, citral-free, ethyl isovalerate, ethyl laurate, styrallyl acetate, cis-3-hexenol, trans-2-hexenal, maltol, ethyl maltol, beta ionone, gamma methyl-ionone, beta-damascenone, 1,4-cineole, 4-methylbenzaldehyde, benzaldehyde, menthyl acetate, allyl caproate, alpha ionone, and jasmin absolute.

DETAILED DESCRIPTION OF THE DRAWING

Figure 1:
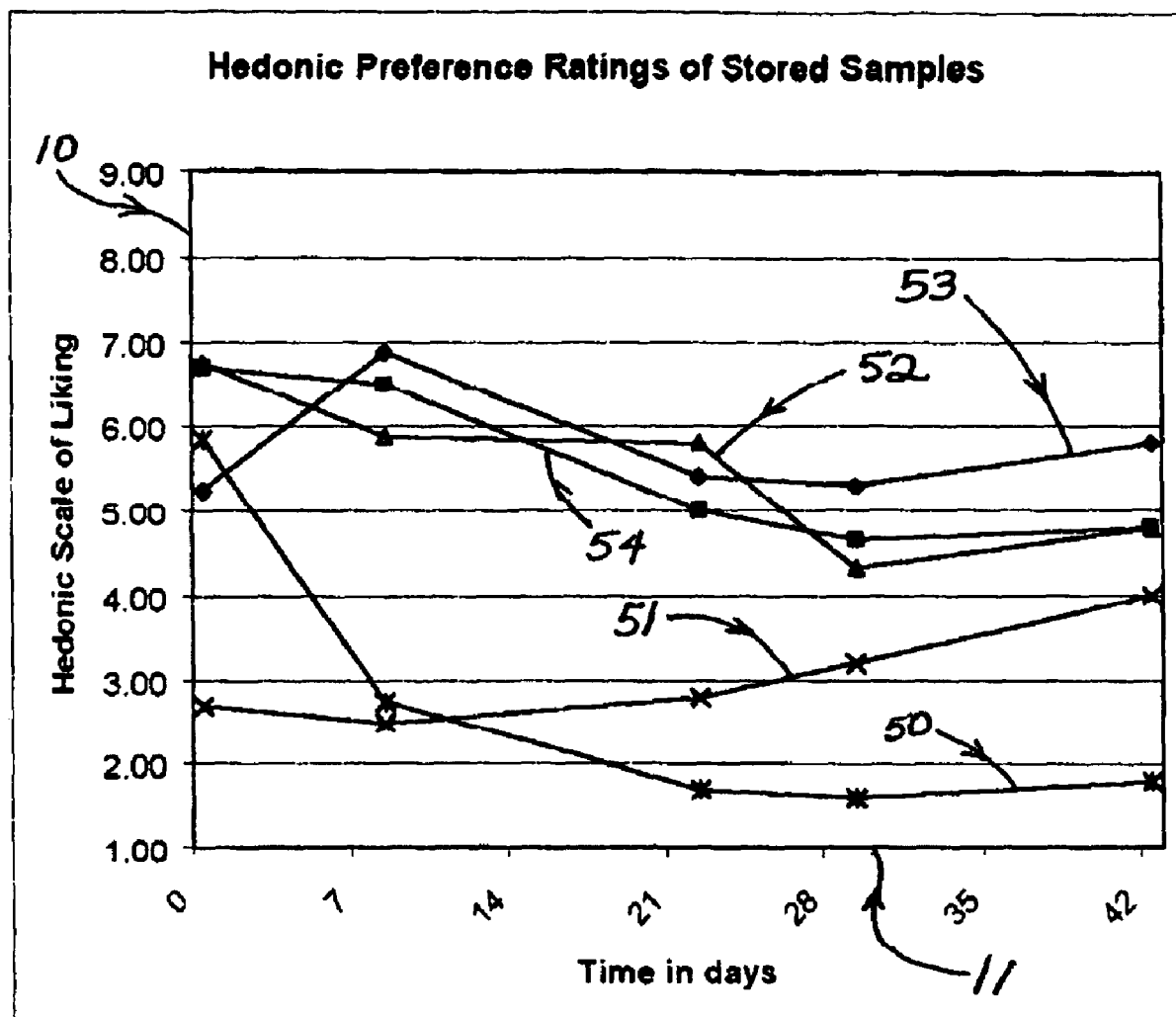
FIG. 1 is a set of graphs of time (measured on the 'x' axis') vs. Hedonic Rating of Liking, measured on the 'y' axis, showing comparative hedonic stabilities of beverages, stored at 40° C. at pH=2.5, containing (1) compositions of matter useful in the practice of our invention, to with: 4,8-dimethyl-3,7-nonadien-2-ol, 4,8-dimethyl-3,7-nonadien-2-yl acetate, and a 50:50 (wt.:wt.) mixture of 4,8-dimethyl-3,7-nonadien-2-ol and 4,8-dimethyl-3,7-nonadien-2-yl acetate and (2) prior art compositions, namely citral and CITRONONE, respectively 3,7-dimethyl-2,6-octadienal and 4,8-dimethyl-3,7-nonadien-2-one.

Referring to FIG. 1, the measurement of time, in days, is set forth on the 'x' axis indicated by reference numeral 11 and the measurement of the Hedonic Rating of Liking, on a scale of from 1.00 up to 9.00, is set forth on the 'y' axis indicated by reference numeral 10. The reference numerals for each of the graphs of the Hedonic Rating of Liking vs. time, days, for each of the compositions evaluated are set forth in the following table:

| Composition | Reference Numeral |
|---|---|
| 4,8-dimethyl-3,7-nonadien-2-ol | 53 |
| 4,8-dimethyl-3,7-nonadien-2-yl acetate | 54 |
| 50:50 (wt.:wt.) mixture of 4,8-dimethyl-3,7-nonadien-2-ol and 4,8-dimethyl-3,7-nonadien-2-yl acetate | 52 |
| 3,7-dimethyl-2,6-octadienal (Citral) | 50 |
| 4,8-dimethyl-3,7-nonadien-2-one (CITRONONE) | 51 |

The following non-limiting examples are presented for purposes of illustration:

Example I

Preparation of (3E)-2,4,8-trimethyl-3,7-nonadien-2-ol and (3Z)-2,4,8-trimethyl-3,7-nonadien-2-ol

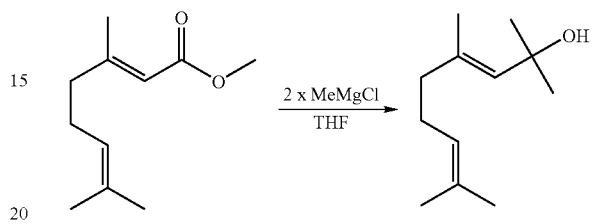

800 mL of methyl magnesium chloride (MeMgCl, 3 M in THF) was charged to a flame dried flask under nitrogen atmosphere and methyl geranate (0.5 equivalents 218 g) was added over 90 minutes with stirring and cooling such that the temperature was maintained below 25° C. (10-25° C.). The mixture was stirred at 25±1° C. for about 3 hours and then added to ice chips (4 L) and then acidified with 5% aqueous acetic acid (3 L) to a pH of 6.

The mixture was extracted twice with methyl t-butyl ether (1 L), dried over sodium sulfate and concentrated to 221.6 g of crude product. Distillation at 1 mmHg and 58-60° C. afforded 182.6 g, 83% of product, the structure of which was confirmed by $^1$H NMR. The NMR assignments were as follows:

| NMR Assignments | Interpretation |
|---|---|
| 1.35 ppm (2s, 6H) | —C(C$\underline{H}_3$)(OH)(C$\underline{H}_3$) |
| 1.51 ppm (br.s, 1H) | —C(CH$_3$)(O$\underline{H}$)(CH$_3$) |
| 1.6 ppm (2s, 3H) | —C=C(CH$_3$)(C$\underline{H}_3$) |
| 1.7 ppm (2s, 3H) | —C=C(C$\underline{H}_3$)(CH$_3$) |
| 1.85 ppm (2s, 3H) | =C—C$\underline{H}_3$ |
| 1.58-2.7 ppm (m, 4H) | —(C$\underline{H}_2$)— |
| 3.68 ppm (2s) | — |
| 5.08 ppm (m, 71% of 1H with 5.17 ppm peak) | (CH$_3$)$_2$C=C—$\underline{H}$ |
| 5.17 ppm (m, 29% of 1H with 5.08 ppm peak) | (CH$_3$)$_2$C=C—$\underline{H}$ |
| 5.32 ppm (m, 88% of 1H with 5.68 ppm peak) | —C=C$\underline{H}$—C(CH$_3$)$_2$(OH) |
| 5.68 ppm (m, 12% of 1H with 5.32 ppm peak) | —C=C$\underline{H}$—C(CH$_3$)$_2$(OH) |

Similarly, the reaction of methyl 3,7-dimethyl-6-octenoate with methyl Grignard reagent afforded (4R/S)-2,4,8-trimethyl-7-nonen-2-ol in greater than 80% yield.

Example II

Preparation of
α,α,2,4-tetramethyl-3-cyclohexene-1-methyl Acetate

The Dashed Lines in the Scheme Represent Carbon-Carbon Covalent Single Bonding to Asymetric Carbon Atoms Signifying Mixtures of Diastereoisomers To a three neck flask was charged α,α,2,4-tetramethyl-3-cyclohexene-1-methanol (12.6 g, 75 mm), N,N-dimethylaminopyridine (DMAP, 0.46 g) and pyridine (12 g). Acetic anhydride (12.6 g, 123 mm) was added and the reaction was heated at 100±1° C. for 16 hours. The reaction mass was then diluted with dichloromethane (60 g) and then washed twice with 10% hydrogen chloride solution, washed with water, brine, dried with magnesium sulfate and concentrated. After distillation by Kugelruhr, 78° C., 3.5 mmHg, 6.1 g of the product (38% yield) were obtained and confirmed by ¹H NMR. The NMR assignments were as follows:

| NMR Assignments | Interpretation |
| --- | --- |
| (0.95 ppm + 1.04 ppm) (d, 3H) | CH₃—C= |
| 1.50 ppm (s, 3H) | —O—C(CH₃)₂ |
| 1.54 ppm (s, 3H) | —O—C(CH₃)₂ |
| 1.62 ppm (s, 3H) | CH₃—C= |
| 1.97 ppm (s, 3H) | CH₃—C(O)—O— |
| (5.16 ppm + 5.33 ppm) (m, 1H) | —CH=C— |
| 1.45-1.59 ppm (m, 1H) | —CH— |
| 1.59-1.68 ppm (m, 1H) | —CH— |
| 1.9 ppm (d/q, 1H) | —(CH₂)— |
| 1.94-2.04 ppm (m, 2H) | —(CH₂)— |
| 2.32 ppm (m, 1H) | —(CH₂)— |

Example III

Preparation of 4,8-dimethyl-3,7-nonadien-2-yl Butyrate

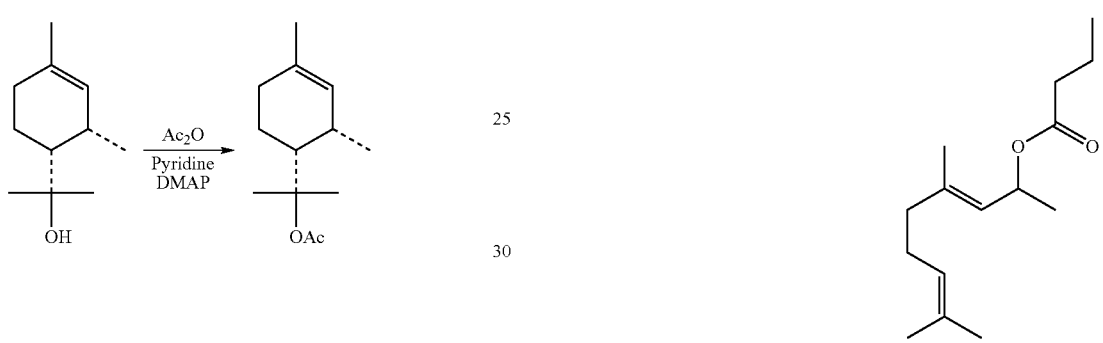

A flask was charged with 4,8-dimethyl-3,7-nonadien-2-ol (CAS 67845-50-5) (20 g), butyric anhydride (25 g) and pyridine (12.5 g). The mixture was stirred and heated to 100° C. The reaction was held at 100±1° C. for 90 minutes and then cooled to room temperature. The reaction mixture was diluted with water (100 mL) and methyl t-butyl ether, washed several times with water until a neutral pH, dried over sodium sulfate and concentrated to furnish 34.4 g of crude product. After distillation by Kugelruhr 23.4 g of the product, 76% yield, were obtained and confirmed by ¹H NMR.

Example IV

Preparation of 4,8-Dimethyl-3,7-nonadien-2-yl (2'-methyl-2'-pentenoate)

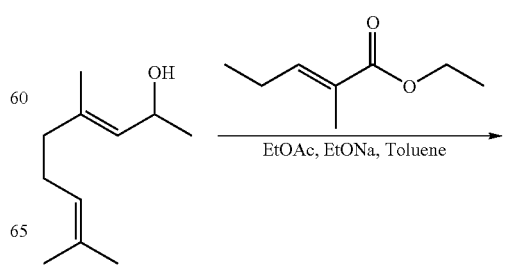

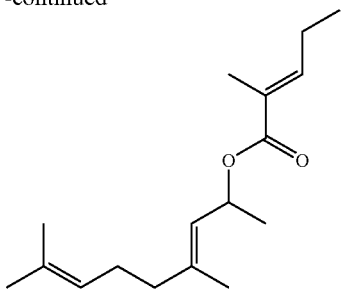

A flame dried flask under nitrogen atmosphere, equipped with Dean-Stark leg, was charged with 4,8-dimethyl-3,7-nonadien-2-ol (CAS 67845-50-5) (30 g), ethyl 2-methyl-2-pentenoate (37.5 g), sodium ethoxide (4.8 g, 21% in ethanol) and toluene (100 mL). The mixture was stirred and heated to reflux, 106±1° C. The reaction was held at reflux for 4 hours after which time 50 mL were drained. 21% Ethoxide solution (2.5 g) and toluene (5 g) were added and the reaction heated and stripped for 1 hour to a pot of about 114° C. The reaction mixture was cooled to room temperature, added to 100 g of 5% acetic acid, washed with water dried over sodium sulfate and concentrated to furnish 57.6 g of crude product. After distillation at about 102° C. and 0.3 mmHg 13.6 g of the product was obtained and confirmed by $^1$H NMR. The NMR assignments were as follows:

| NMR Assignments | Interpretation |
| --- | --- |
| 1.04 ppm (t, 3H, J = 7.56 Hz) | —CH$_2$—C$\underline{H}_3$ |
| 1.29 ppm (d, 3H, J = 6.37 Hz) | —CH—C$\underline{H}_3$ |
| 1.60 ppm (s, 3H) | —CH═C(C$\underline{H}_3$)$_2$ |
| 1.67 ppm (s, 3H) | —CH═C(C$\underline{H}_3$)$_2$ |
| 1.72 ppm (s, 3H) | —CH═C—C$\underline{H}_3$ |
| 1.81 ppm (s, 3H) | —C═C—C$\underline{H}_3$ |
| 2.0-2.5 ppm (m, 6H) | —(C$\underline{H}_2$)$_2$— + —C$\underline{H}_2$— |
| 5.07 ppm (m, 1H) | —C$\underline{H}$═C(CH$_3$)$_2$ |
| 5.20 ppm (m, 1H) | —C$\underline{H}$═C—CH$_3$ |
| 5.65 ppm (pentet, 1H, J = 6.39 Hz) | CH$_3$—C$\underline{H}$—O— |
| 6.72 ppm (t, 1H, J = 7.39 Hz) | —CO—C(CH$_3$)═C$\underline{H}$—CH$_2$— |

Example V

Compounded Lemon Top-Note Example

The following composition was prepared:

| Ingredients | Weight (g) |
| --- | --- |
| Aldehyde C-8 | 5 |
| Aldehyde C-9 | 5 |
| Aldehyde C-10 | 3 |
| Valencene | 5 |
| Geranyl Acetate | 125 |
| Neryl Acetate | 94 |
| Alpha-Terpineol | 4 |
| 4-Terpinenol | 4 |
| Citronellal | 8 |
| Linalool | 5 |
| Nerol | 47 |
| Geraniol | 47 |
| Ocimene | 31 |
| Myrcene | 8 |
| Beta-pinene | 468 |
| Alpha-pinene | 94 |

The addition of 23 g of 4,8-dimethyl-3,7-nonadien-2-ol, 23 g of 4,8-dimethyl-3,7-nondien-2-yl acetate, and 1 g of 2,4,8-trimethyl-7-nonen-2-ol to the above mixture increased the overall flavor impact, increased the fresh lemon character, and added a lemon juice type character. The resulting mixture was added at a level of 0.001% to carbonated water at a pressure of 3 atmospheres absolute.

Example VI

Preparation of a Flavor Composition Using Lemon Oil

Citral-Less Lemon Example

The addition of 12 g of 4,8-dimethyl-3,7-nonadien-2-ol, 6 g of 4,8-dimethyl-3,7-nondien-2-yl acetate, and 0.2 g of 2,4,8 trimethyl-7-nonen-2-ol to 1000 g of a citral-less lemon oil increased the fresh lemon aroma, increased the overall impact, and added a lemon juice character to the flavor profile. The resulting mixture was added at a level of 0.005% to carbonated water at a pressure of 3.5 atmospheres absolute.

Example VII

Preparation of a Flavor Composition Using Citrus Oils (citrus example)

The following composition was prepared:

| Ingredients | Weight (g) |
| --- | --- |
| Mandarin Oil | 10 |
| Tangerine oil | 15 |
| Lemon oil | 370 |
| Expressed Lime oil | 12 |
| Orange Oil | 485 |
| Grapefruit Oil | 48 |
| Geraniol | 1 |
| Ethyl Butyrate | 7 |
| Ethyl Acetate | 32 |

The addition of 5 g of 4,8-dimethyl-3,7-nonadien-2-ol, 5 g of 4,8-dimethyl-3,7-nondien-2-yl acetate, and 10 g of 2,4,8 trimethyl-7-nonen-2-ol to the above mixture enhanced the overall fresh juice perception and increased the fresh orange juice impact. The resulting mixture was added at a level of 0.003% to carbonated water at a pressure of 4 atmospheres absolute.

Example VIII

Preparation of a Flavor Composition Using Grapefruit Oil (grapefruit example)

The following composition was prepared:

| Ingredients | Weight (g) |
| --- | --- |
| Grapefruit oil | 900 |
| Orange oil | 36 |
| Bergamot oil | 5 |
| Nootkatone | 1 |
| Ethyl Butyrate | 2 |
| Allyl Caproate | 1 |

The addition of 5 g of 4,8-dimethyl-3,7-nonadien-2-ol, 5 g of 4,8-dimethyl-3,7-nondien-2-yl acetate, and 45 g of 2,4,8 trimethyl-7-nonen-2-ol to the above mixture increased the grapefruit character of the aroma, increased the grapefruit flavor, and added a lingering grapefruit aftertaste. The resulting mixture was added at a level of 0.003% to carbonated water at a pressure of 2.5 atmospheres absolute.

Example IX

Preparation of a Flavor Composition for Berry Flavor (mixed berry example)

The following composition was prepared:

| Ingredients | Weight (g) |
| --- | --- |
| Acetic acid | 1 |
| Lactic Acid | 2 |
| Methyl Butyric Acid | 12 |
| Ethyl Acetate | 5 |
| Ethyl Butyrate | 12 |
| Ethyl Caproate | 6 |
| Ethyl Iso Valerate | 5 |
| Ethyl Laurate | 2 |
| Isoamyl butyrate | 3 |
| Ethyl Phenylglycidate | 0.5 |
| Styrallyl acetate | 0.2 |
| Cis-3 Hexenyl Butyrate | 1 |
| Cis-3 Hexenyl Acetate | 1 |
| Cis-3 Hexenol | 3 |
| Trans-2 Hexenal | 2 |
| 4-(4-hydroxyphenyl)-2-butanone | 0.2 |
| Methyl-gamma-ionone | 0.5 |
| Gamma decalactone | 10 |
| Methyl cinnamate | 9 |
| Ethyl Maltol | 60 |
| Propylene Glycol (solvent) | 864.6 |

The addition of 1 g of 4,8-dimethyl-3,7-nonadien-2-ol to the above mixture enhanced the ionone character and increased the seedy raspberry flavor. The resulting mixture was added at a level of 0.01% to carbonated water at a pressure of 3.5 atmospheres absolute.

Example X

Flavor Compositions Prepared for a Flavor Stability Study in Acidic Lemonade Base (lemonade base)

The following lemonade base composition was prepared:

| Ingredients | Weight (g) |
| --- | --- |
| Water | 866.82 |
| High Fructose Corn Syrup 55% | 129.8 |
| Citric Acid | 3.38 |

The following control lemon flavor composition was prepared and then added at a level of 0.30% to the lemonade base, described herein:

| Ingredients | Weight (g) |
| --- | --- |
| Citral-less lemon oil extract | 960 |
| Citral | 0.40 |
| Ethanol | 39.6 |

The following test lemon flavor was prepared and then added at a level of 0.30% to the lemonade base described herein:

| Ingredients | Weight (g) |
| --- | --- |
| Citral-less lemon oil extract | 960 |
| 4,8-dimethyl-3,7-nonadien-2-ol | 0.24 |
| 4,8-dimethyl-3,7-nonadien-2-yl acetate | 0.15 |
| 2,4,8-trimethyl-7-nonen-2-ol | 0.004 |
| Ethanol | 39.606 |

After being stored at 40° C. for one month, the lemonade containing the control lemon flavor developed off notes reminiscent of benzaldehyde and tolyl aldehyde. The beverage containing the control flavor became medicinal with a decreased lemon character.

After being stored at 40° C. for one month the lemonade containing the test lemon flavor was described as a slightly tart, fresh lemon flavor.

Example XI

Cranberry Flavor Example

The following composition was prepared:

| Ingredients | Weight (g) |
| --- | --- |
| Ethyl Butyrate | 0.2 |
| 2-methyl-3-pentenoic acid | 0.2 |
| Menthyl acetate | 0.2 |
| Ethyl Acetate | 12 |
| 4-(4-hydroxyphenyl)-2-butanone | 0.03 |
| Beta ionone | 0.008 |
| Allyl caproate | 0.3 |
| Cis-3-Hexenol | 0.2 |
| Geranyl Butyrate | 0.3 |
| Benzaldehyde | 0.3 |
| Trans-2-methyl-2-butenoic acid | 0.1 |

-continued

| Ingredients | Weight (g) |
| --- | --- |
| β-Damascenone | 0.004 |
| 1,4-Cineole | 0.07 |
| Alpha Terpineol | 0.07 |
| 4-methyl benzaldehyde | 0.1 |
| LINALOOL | 0.2 |
| Tannic acid | 88 |
| Methyl Butyric acid | 9 |
| Ethanol (solvent) | 888.718 |

The addition of 0.5 g of 2,4,8-trimethyl-3,7-nonadien-2-ol and 0.5 g of α,α,2,4-tetramethyl-3-cyclohexene-1-methanol to the above composition enhanced the fleshy/fruity notes and increased the berry character. The resulting composition was added to apple juice at the level of 0.3% thereby producing an aesthetically pleasing cranberry juice-drink.

Example XII

Punch Flavor Example

The following composition was prepared:

| Ingredients | Weight (g) |
| --- | --- |
| Benzaldehyde | 500 |
| Single fold Orange Oil | 415 |
| Single fold Grapefruit Oil | 33.4 |
| Ethyl Caproate | 16.6 |
| Ethyl Butyrate | 16.6 |
| Ethyl Iso Valerate | 8.3 |
| Ethyl Propionate | 3.3 |
| Alpha Ionone | 0.1 |
| Jasmin Absolute | 0.1 |
| Geraniol | 3.3 |
| Iso Amyl Acetate | 3.3 |

The addition of 6.5 g of 4,8-dimethyl-3,7-nonadien-2-yl 2-methyl-2-pentenoate and 6.5 g of α,α,2,4-tetramethyl-3-cyclohexene-1-methyl acetate to the above mixture enhanced the orange and berry notes and softened the cherry notes. At the level of 0.003%, the resulting composition was added to a solution containing 5% food grade ethanol and 95% water thereby providing an aesthetically pleasing punch beverage.

Example XIII

Preparation of Flavored Alcoholic Beverages

The following compositions were prepared:
Composition A:

| Ingredients | Weight (g) |
| --- | --- |
| 4,8-dimethyl-3,7-nondien-2-ol | 45 |
| 2,4,8-trimethyl-7-nonen-2-ol | 10 |
| 4,8-dimethyl-3,7-nonadien-2-yl acetate | 45 |

Composition B:

| Ingredients | Weight (g) |
| --- | --- |
| 4,8-dimethyl-3,7-nondien-2-ol | 35 |
| 2,4,8-trimethyl-7-nonen-2-ol | 30 |
| 4,8-dimethyl-3,7-nonadien-2-yl acetate | 35 |

Composition C:

| Ingredients | Weight (g) |
| --- | --- |
| 4,8-dimethyl-3,7-nondien-2-ol | 50 |
| 4,8-dimethyl-3,7-nonadien-2-yl acetate | 50 |

The following bases were prepared:
Low Proof Alcohol Base:

| Ingredients | Weight (Kg) |
| --- | --- |
| citric acid | 0.3 |
| 190 proof food grade ethanol | 5.0 |
| HFCS-42 (High Fructose (42%)corn syrup) | 14.0 |
| water | 80.7 |

High Proof Alcohol Base:

| Ingredients | Weight (Kg) |
| --- | --- |
| citric acid | 0.3 |
| 80 Proof FINLANDIA ® vodka | 99.7 |

At the rates of 10 ppm, 30 ppm and 50 ppm each of compositions A, B and C and each of the oxo-terpene derivative compounds of our invention:

4,8-dimethyl-3,7-nondien-2-ol;
2,4,8-trimethyl-7-nonen-2-ol; and
4,8-dimethyl-3,7-nonadien-2-yl acetate were added to each of the low proof base and the high proof base. Each of Composition A, Composition B, Composition C, and the oxo-terpene derivative compounds imparted to each of the bases a lemon/lime character. The resulting flavored bases were then stored at 40° C. for a period of eight weeks. At the end of the eight week period, a second taste test was conducted. The results of the second taste test were identical to those of the initial taste test. There was no detectable loss in flavor quality of either the low proof base or the high proof base.

Example XIV (A) Powder Flavor 20 g of the flavor composition of Example IX was emulsified in a solution containing 300 g of gum acacia and 700 g of water. The emulsion was spray-dried with a Bowen Lab Model Drier utilizing 250 cubic feet per minute of air with an inlet temperature of 500° F. and an outlet temperature of 200° F., and a wheel speed of 50,000 revolutions per minute.

(B) Paste Blend

The following mixture was then prepared:

| Ingredients | Weight (Kg) |
|---|---|
| Liquid Flavor Composition of Example IX (See, above) | 48.4 |
| CAB-O-SIL (Brand Silica, Cabot Corporation, Boston, Massachusetts; Surface Area: 200 m²/gm; Nominal Particle Size: 0.012 microns; Density: 0.667 pounds/ft.³) | 3.2 |

The CAB-O-SIL was dispersed in the liquid flavor composition with vigorous stirring, thereby providing a viscous liquid. 48.4 Parts by weight of the powder flavor composition prepared in Part A was then blended into the said viscous liquid, with stirring at 25° C. for a period of 30 minutes providing a thixotropic sustained release flavor paste.

Example XV

Chewing Gum

100 Parts by weight of chicle was mixed with 4 parts by weight of the flavor prepared in accordance with Example XIV. 300 Parts sucrose and 100 parts corn syrup were also added. Mixing was effected in a ribbon blender with jacketed sidewalls of the type manufactured by Baker Perkins Co.

The resultant chewing gum blend was then manufactured into strips 1 inch in width and inches in thickness. These strips were cut into lengths of 3 inches each. On chewing, the gum had a pleasant long-lasting raspberry-strawberry flavor.

Example XVI

Toothpaste Formulation

The following separate groups of ingredients were prepared:

Group "A":

| Ingredients | Weight (%) |
|---|---|
| glycerin | 30.2 |
| distilled water | 15.3 |
| sodium benzoate | 0.1 |
| sodium saccharin | 0.2 |
| stannous fluoride | 0.5 |

Group "B":

| Ingredients | Weight (%) |
|---|---|
| calcium carbonate | 12.5 |
| dicalcium phosphate (dihydrate) | 37.2 |

Group "C":
2 Parts by weight of sodium n-lauroyl sarcosinate (a foaming agent).

Group "D":
1.2 Parts by weight of the flavor material produced according to Example XIV.

Procedure:
(1) The ingredients in Group "A" were stirred and heated in a steam jacketed kettle to 160° F.
(2) Stirring was continued for an additional 3 to 5 minutes to form a homogeneous gel.
(3) The powders of Group "B" were added to the gel, while mixing until a homogeneous paste was formed.
(4) With stirring, the flavor of Group "D" was added, followed by addition immediately thereafter of the foaming agent of Group "C".
(5) The resultant slurry was then blended for one hour.

The completed paste was then transferred to a three-roller mill, homogenized and finally tubed. The resulting toothpaste when used in a normal tooth brushing procedure provided a pleasant mixed berry flavor of constant strong intensity throughout said procedure (1-1.5 minutes).

Example XVII

Chewable Vitamin Tablets

The flavor material prepared according to Example XIV was added to a chewable vitamin tablet formulation at a rate of 5 gm/kg, wherein the chewable vitamin formulation was prepared as follows:

The following ingredients are blended:

| Ingredients | Weight (g per 1000 Tablets) |
|---|---|
| Vitamin C (ascorbic acid) | 70.0 |
| Vitamin $B_1$ (thiamine mononitrate) | 4.0 |
| Vitamin $B_2$ (Riboflavin) | 5.0 |
| Vitamin $B_6$ (pyridoxine hydrochloride) | 4.0 |
| Niacinamide | 33.0 |
| Calcium Pantothenate | 11.5 |
| Vitamin $B_{12}$ (cyanocobalamin) | 3.5 |
| Vitamin E acetate (dl-α-tocopheryl acetate) | 6.8 |
| d-biotin | 0.04 |
| certified lake color | 5.0 |
| flavor of Part B of Example XIV | 5.0 |
| Sodium Saccharin-sweetener | 1.0 |
| magnesium stearate | 10.0 |
| mannitol | 500 |

Preliminary tablets were prepared by slugging, with flat-faced punches and grinding the slugs to 14 mesh. 13.5 g Dry Vitamin A acetate and 0.6 g Vitamin D were then added as beadlets. The entire blend was then compressed using concave punches at 0.5 g each.

Chewing of the resultant tablet yielded a pleasant, long-lasting consistently strong mixed berry flavor for a period of 12 minutes.

Example XVIII

Lemon-Lime Flavor Example

The following composition was prepared:

| Ingredients | Weight (g) |
|---|---|
| Distilled Lime Oil | 500 |
| Citral-less Lemon Oil | 500 |

The addition of 2.5 g of 4,8-dimethyl-3,7-nonadien-2-ol, 2.5 g of 4,8-dimethyl-3,7-nonadien-2-yl acetate, and 2 g of a 51:49 trans:cis isomer ratio mixture of 1-methoxydec-1-ene prepared according to Example VI of U.S. Ser. No. 10/195,663, filed Jul. 15, 2002, incorporated herein by reference, referred to herein as "decanal methyl enol ether", to the above mixture increased the brightness of the lemon flavor, decreased the oily character of the flavor, and increased the citrus pulp character of the mixture. The addition of the decanal methyl enol ether to the blend of 4,8-dimethyl-3,7-nonadien-2-ol and 4,8-dimethyl-3,7-nonadien-2-yl acetate had a synergistic effect. When the resulting mixture was added at a level of 0.004% to carbonated water at a pressure of 3 atmospheres absolute, the decanal methyl enol ether increased the overall lemon impact of the of 4,8-dimethyl-3,7-nonadien-2-ol and 4,8-dimethyl-3,7-nonadien-2-yl when compared to a beverage that did not contain this material.

Example XIX

Orange Top Note Example

The addition of 5 g of 4,8-dimethyl-3,7-nonadien-2-ol, 5 g of a 55:45 cis:trans isomer ratio mixture of 1-ethoxydec-1-ene prepared according to Example VII of U.S. Ser. No. 10/195,663, filed Jul. 15, 2002, incorporated herein by reference, referred to herein as "decanal ethyl enol ether", and 2.5 g of decanal methyl enol ether to 1000 g of single fold orange oil decreased the peel oil notes of the orange oil. This combination also rounded out the profile of the oil and increased the orange pulp and orange juice character of the oil. The resulting combination was added at a level of 0.002% to carbonated water at a pressure of 3.5 atmospheres absolute.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:
1. A composition consisting essentially of:
 from about 20 up to about 80 weight % of 4,8-dimethyl-3,7-nonadien-2-ol; and
 from about 20 up to about 80 weight % of 4,8-dimethyl-3,7-nonadien-2-yl acetate.

\* \* \* \* \*